United States Patent
Yu et al.

(10) Patent No.: US 12,278,997 B2
(45) Date of Patent: Apr. 15, 2025

(54) FEATURE DATA ENCODING METHOD, APPARATUS AND DEVICE, FEATURE DATA DECODING METHOD, APPARATUS AND DEVICE, AND STORAGE MEDIUM

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Yuchao Shao, Dongguan (CN); Hualong Yu, Dongguan (CN); Zhihuang Xie, Dongguan (CN); Zhenyu Dai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 112 days.

(21) Appl. No.: 18/132,020

(22) Filed: Apr. 7, 2023

(65) Prior Publication Data
US 2023/0247230 A1 Aug. 3, 2023

Related U.S. Application Data

(63) Continuation of application No. PCT/CN2020/119850, filed on Oct. 7, 2020.

(51) Int. Cl.
*H04N 19/00* (2014.01)
*H04N 19/172* (2014.01)
*H04N 19/90* (2014.01)

(52) U.S. Cl.
CPC .......... *H04N 19/90* (2014.11); *H04N 19/172* (2014.11)

(58) Field of Classification Search
CPC ...... H04N 19/90; H04N 19/172; H04N 19/70; H04N 19/85; H04N 19/597
See application file for complete search history.

(56) References Cited

U.S. PATENT DOCUMENTS

| 5,487,086 A * | 1/1996 | Bhaskar | G10L 19/0212 |
| | | | 375/243 |
| 7,460,041 B2 * | 12/2008 | Yang | H03M 7/4006 |
| | | | 341/51 |

(Continued)

FOREIGN PATENT DOCUMENTS

| CN | 102333223 A | 1/2012 |
| CN | 109101948 A | 12/2018 |

(Continued)

OTHER PUBLICATIONS

International Search Report in the international application No. PCT/CN2020/119850, mailed on Jun. 2, 2021.

(Continued)

*Primary Examiner* — Frank F Huang
(74) *Attorney, Agent, or Firm* — BAYES PLLC

(57) ABSTRACT

A feature data encoding method is provided. First feature data corresponding to each of channels to be encoded is determined; data type conversion processing is performed on the first feature data corresponding to each channel to obtain second feature data that meets a data input condition of an apparatus for encoding feature data; spatial re-expression is performed on the second feature data corresponding to each channel to obtain third feature data, wherein a height of the third feature data is a first height, a width of the third feature data is a first width, and the third feature data comprises the second feature data located at a target position of each of the channels; and the third feature data is encoded and signalled in a bitstream.

17 Claims, 12 Drawing Sheets

(56) References Cited

U.S. PATENT DOCUMENTS

| | | | | |
|---|---|---|---|---|
| 8,135,062 B1* | 3/2012 | Cote | ...................... | H04N 19/198 375/240.03 |
| 9,826,241 B2* | 11/2017 | Shima | ................... | H04N 19/126 |
| 2006/0018559 A1 | 1/2006 | Kim | | |
| 2007/0030180 A1* | 2/2007 | Yang | ...................... | H04N 19/44 341/50 |
| 2009/0067493 A1* | 3/2009 | Jun | ...................... | H04N 19/176 375/E7.076 |
| 2011/0279644 A1* | 11/2011 | Suh | ................... | H04N 21/23614 348/E13.001 |
| 2012/0257674 A1* | 10/2012 | Macq | ................... | H04N 19/109 375/E7.243 |
| 2013/0003828 A1* | 1/2013 | Cohen | .................... | H04N 19/61 375/240.12 |
| 2014/0016698 A1* | 1/2014 | Joshi | ...................... | H04N 19/14 375/240.12 |
| 2014/0226721 A1* | 8/2014 | Joshi | .................... | H04N 19/176 375/240.12 |
| 2014/0376633 A1* | 12/2014 | Zhang | ................... | H04N 19/597 375/240.16 |
| 2016/0219283 A1* | 7/2016 | Chen | ................... | H04N 19/105 |
| 2023/0040392 A1* | 2/2023 | Aoki | ................ | H04N 21/21805 |

FOREIGN PATENT DOCUMENTS

| | | |
|---|---|---|
| CN | 111669601 A | 9/2020 |
| CN | 111726633 A | 9/2020 |

OTHER PUBLICATIONS

Written Opinion of the International Search Authority in the international application No. PCT/CN2020/119850, mailed on Jun. 2, 2021.

Anonymous: "Test Model 4 for Immersive Video. MPEG document N19002", ISO/IEC JTC 1/SC 29/WG 11, MPEG 129th meeting, Mar. 1, 2020(Mar. 1, 2020), pp. 1-45, XP055862369, cited in figures 1-4, table 1, figures 16, 17, sections 5.g and 5.k, p. 23, p. 25, and section 6.t. 45 pages.

Partial Supplementary European Search Report in the European application No. 20956474.9, mailed on Jun. 13, 2023. 12 pages.

S Khalid: "Introduction to Data Compression", Jan. 1, 2006 (Jan. 1, 2006), University of Nebraska, XP055498966, cited in section 9, example 9.5.2, and p. 246. 703 pages.

Madhukar Budagavi et al: "Video coding using compressed reference frames", Acoustics, Speech and Signal Processing, 2008. ICASSP 2008. IEEE International Conference on, IEEE, Piscataway, NJ, USA, Mar. 31, 2008 (Mar. 31, 2008), pp. 1165-1168, XP031250764, ISBN: 978-1-4244-1483-3, cited in section 3. 4 pages.

Supplementary European Search Report in the European application No. 20956474.9, mailed on Aug. 21, 2023. 14 pages.

* cited by examiner

FEATURE DATA ENCODING METHOD, APPARATUS AND DEVICE, FEATURE DATA DECODING METHOD, APPARATUS AND DEVICE, AND STORAGE MEDIUM

CROSS-REFERENCE TO RELATED APPLICATION

This is a continuation of International Patent Application No. PCT/CN2020/119850 filed on Oct. 7, 2020, the disclosure of which is hereby incorporated by reference in its entirety.

BACKGROUND

At present, in the process of traditional video encoding and decoding, the feature map encoding and decoding process includes three main modules: pre-quantization/pre-dequantization, repack/derepack, and traditional video encoder/decoder. Data of the pre-quantized and repacked feature map array is sent to the traditional video encoder for compression and encoding in the form of luminance chrominance (YUV) video data, and the bitstream generated by the traditional video encoder is included in the data bitstream of the feature map. Repack/derepack has several optional modes, which is superposition of feature map in a specified order, tiling of feature map in a default order or in a specified order respectively.

However, in the superposition mode, only a single list is applied to describe the order of feature channels, and there is no guidance and design for reference relationship among feature channels in video encoding and decoding device, which makes the encoding efficiency among feature channels after superposition not high. In the tiling mode, the multi-channel data of feature are tiled in a picture according to the order described in a single list, and the multi-channel data are closely adjacent, which leads to the data of multiple channels being partitioned into the same coding unit by the block partition operation when encoding the tiled picture using the existing method for processing feature data. Because of the discontinuity among different channel data, the correlation of different channel data in the same coding unit is poorer, such that the efficiency of the existing method for processing feature data cannot be effectively exerted.

Therefore, there is at least a problem of low encoding efficiency when encoding based on feature data in related art.

SUMMARY

Embodiments of the present disclosure relate to the encoding and decoding technology in the communication field, and in particular to a method, an apparatus and a device for encoding and decoding feature data, and a storage medium.

According to the embodiments of the present disclosure, there is provided a method, an apparatus and a device for encoding and decoding feature data, and a storage medium. Second feature data is processed into third feature data having a height conforming to the first height and a width conforming to the first width by a spatial re-expression technique. Meanwhile, the third feature data includes second feature data located at target positions of each channel, that is, the second feature data is padded with the target size and the padding position is specified to ensure that there is only one feature data in a coding unit. The jump among data tends to be flat through the above padding mode, which reduces the interaction of feature data among different channels during encoding, and avoids the occurrence of feature data of two channels in the same coding block when encoding the feature data, so as to efficiently utilize the existing video encoding and decoding standards, thereby improving the encoding efficiency of the feature data.

The technical solution of the embodiments of the present disclosure can be realized as follows.

According to a first aspect, the embodiments of the present disclosure provide a method for encoding feature data, which includes the following operations.

First feature data corresponding to each of channels to be encoded is determined.

Data type conversion processing is performed on the first feature data corresponding to each channel to obtain second feature data that meets a data input condition of an apparatus for encoding feature data.

Spatial re-expression is performed on the second feature data corresponding to each channel to obtain third feature data. A height of the third feature data conforms to a first height, a width of the third feature data conforms to a first width, and the third feature data includes the second feature data located at a target position of each of the channels.

The third feature data is encoded and signalled in a bitstream.

According to a second aspect, the embodiments of the present disclosure provide a method for decoding feature data, which includes the following operations.

A bitstream from an apparatus for encoding feature data is acquired.

The bitstream is decoded to obtain third feature data.

Spatial inverse expression is performed on the third feature data to obtain second feature data corresponding to each of channels. A height of the third feature data conforms to a first height, a width of the third feature data conforms to a first width, and the third feature data includes the second feature data located at a target position of each of the channels.

Data type conversion processing is performed on the second feature data corresponding to each channel to obtain first feature data corresponding to each channel.

According to a third aspect, the embodiments of the present disclosure provide a device for encoding feature data, including a first memory and a first processor.

The first memory is configured to store encoded instructions of executable feature data.

The first processor is configured to execute the encoded instructions of the executable feature data stored in the first memory to implement the method for processing feature data according to the first aspect.

According to the embodiments of the present disclosure, there is provided a method, an apparatus and a device for encoding and decoding feature data, and a storage medium. The method for processing feature data includes that: first feature data corresponding to each of channels to be encoded is determined; data type conversion processing is performed on the first feature data corresponding to each channel to obtain second feature data that meets a data input condition of an apparatus for encoding feature data; spatial re-expression is performed on the second feature data corresponding to each channel to obtain third feature data, where a height of the third feature data conforms to a first height, a width of the third feature data conforms to a first width, and the third feature data includes the second feature data located at target positions of the channels; and the third feature data is encoded and signalled in a bitstream. That is to say, the second feature data is processed into third feature data having a height conforming to the first height and a width conforming to the first width by a spatial re-expression technique. Meanwhile, the third feature data includes second feature data located at the target position of each channel, that is, the second feature data is padded with the target size and the padding position is specified to ensure that there is only one feature data in a coding unit. The jump among data tends to be flat through the above padding mode, which reduces the interaction of feature data among different channels during encoding, and avoids the occurrence of feature data of two channels in the same coding block when encoding the feature data, so as to efficiently utilize the existing video encoding and decoding standards, thereby improving the encoding efficiency of the feature data.

DETAILED DESCRIPTION

In order to make the purpose, technical solution and advantages of the embodiments of the present disclosure clearer, the specific technical solution of the present disclosure will be described in further detail below in conjunction with the accompanying drawings in the embodiments of the present disclosure. The following embodiments are used to illustrate the present disclosure but are not intended to limit the scope of the present disclosure.

Unless otherwise defined, all technical and scientific terms used herein have the same meanings as are commonly understood by those skilled in the art of the present disclosure. Terms used herein are for the purpose of describing embodiments of the present disclosure only and are not intended to limit the present disclosure.

In the following description, reference is made to "some embodiments" that describe a subset of all possible embodiments, but it is understood that "some embodiments" may be the same subset or different subsets of all possible embodiments and may be combined with each other without conflict.

It should be pointed out that the term "first/second/third" in embodiments of the present disclosure is only used to distinguish similar objects, and does not represent a particular ordering of objects. It is understood that "first/second/third" may be interchanged in a particular order or priority order where permitted, so that the embodiments of the present disclosure described herein can be implemented in an order other than that illustrated or described herein.

Prior to further detailed description of the embodiments of the present disclosure, the terms and terminology referred to in the embodiments of the present disclosure will be explained, and the terms and terminology are applicable to the following interpretation.

1) Three-dimensional (3D) feature data tensor expression includes channel number, height and width, abbreviated as (C, H, W).

Figure 1:
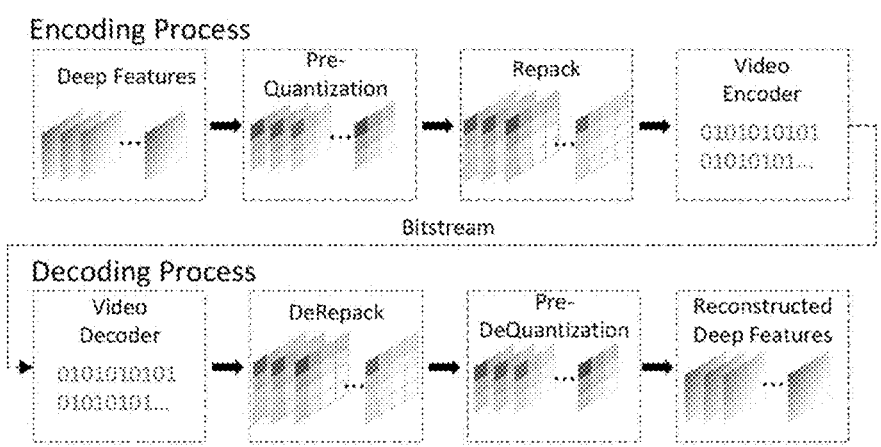
FIG. 1 is a block diagram of a process of encoding and decoding in related art.

In a block diagram of a process of encoding and decoding in related art as shown in FIG. 1, the process involves three main modules: pre-quantization/pre-dequantization, repack/derepack, and traditional video encoder/decoder.

Pre-quantization/pre-dequantization is used when the original input feature map is floating-point type, the feature map needs to be pre-quantized to convert it into integer data conforming to the input requirements of the traditional video encoder.

The repack/derepack is used for the repacking module to transform the original feature map three-dimensional array into yuv format conforming to the input requirements of the traditional video encoder. At the same time, by changing the combination manner of feature map, the encoding efficiency of traditional video encoder for feature map data is improved. Repack/derepack has optional several modes, which is superposition of feature map in a specified order, tiling of feature map in a default order or in a specified order respectively.

Superposition of feature map in a specified order: in this mode, each channel of the feature map corresponds to one picture in the input data of the traditional video encoder. The height and width of the feature map are padded to the height and width that meet the input requirements of the traditional video encoder. The channel order of the feature map is recorded by the repack_order_list, where the contents of the repack_order_list may default to an array with default order (for example, [0, 1, 2, 3, . . . ]).

Tiling of feature map in a default order or in a specified order: in this mode, multiple channels of feature map are tiled and spliced into a two-dimensional array as one picture in the input data of the traditional video encoder. The height and width of the spliced array are padded to the height and width conforming to the input requirements of the traditional video encoder. The splicing order is the channel order of the original feature map, which is arranged in an order with the wide direction of the array given priority and then the high direction followed. After the current picture is paved, the next picture is created and continued to be tiled until all the channels of the feature map are tiled. The channel order is recorded by the repack_order_list, where the contents may default to an array with default order (for example, [0, 1, 2, 3, . . . ]).

In traditional video encoding/decoding, data of the pre-quantized and repacked feature map array is sent to the traditional video encoder for compression and encoding in the form of yuv video data, and the bitstream generated by the traditional video encoder is included in the feature map data bitstream. For HEVC video encoder, the feature map array is input in 4:0:0 format. For AVS3 video encoder, the feature map array is input in 4:2:0 format.

In related art, the encoding and decoding process may also be realized by the following steps. In moving picture experts group (MPEG) immersive video, there is a technology to re-express and rearrange the contents of pictures captured by various cameras at the same time, so as to express and encode visual information efficiently. Specifically, in the MPEG immersive video, multiple cameras will be placed according to a certain position relationship in the scene to be shot, and these cameras are also called reference viewpoints. There is some visual redundancy among the contents shot by each of the reference viewpoints, so it is necessary to re-express and reorganize the pictures of all reference viewpoints at the encoding end to remove the visual redundancy among viewpoints. At the decoding end, the re-expressed and reorganized information needs to be decoded and restored.

At the encoding end, the picture of the reference viewpoint is re-expressed by intercepting the picture of the reference viewpoint to obtain patches with different sizes in rectangular shape. After all necessary patches are intercepted, these patches are sorted from large to small. According to the above order, the patches are placed one by one on a picture to be padded having higher resolution, and the picture to be padded is called atlas. When placing the patches, the pixel at the upper-left of each patch must fall on the pixel at the upper-left of the partitioned 8*8 picture block in the picture to be padded. Every time a patch is placed, the placement serial number of the currently placed patch, the coordinates of the pixel at the upper-left and the resolution of the patch will be recorded and stored in the patch information list (also referred to as Patch List) in order. When all the patches are placed, the atlas and Patch List will be sent to the traditional video encoder/decoder for encoding.

At the decoding end, after obtaining the reconstructed atlas and Patch List, pixels in the patches placed in the atlas are rendered one by one according to the order of placing the patches recorded in the Patch List, so as to synthesize a picture at the viewer's viewpoint.

The encoding and decoding process in the related art as described above has at least the following defects.

First defect: in the superposition mode, only a single list is applied to describe the order of feature channels, the order of feature channels is not optimized according to the correlation among feature channels, and there is no guidance and design for reference relationship among feature channels in video codec, which makes the encoding efficiency among feature channels after superposition not high.

Second defect: in the tiling mode, the multi-channel data of feature are tiled in a picture according to the order in a single list, and the multi-channel data are closely adjacent, which leads to the data of multiple channels being partitioned into the same coding unit by the block partition operation when encoding the tiled picture using the existing encoding and decoding methods. Because of the discontinuity among different channel data, the correlation of different channel data in the same coding unit is poorer, so the efficiency of the existing encoding and decoding methods cannot be effectively exerted, and the compression effect of feature data is not good enough.

Third defect: the scheme of re-expressing and rearranging visual information in MPEG immersive video is only placed in order according to the strategy of sorting areas of patches from large to small. The texture similarity and spatial position similarity among the patches are not considered when placing, which will lead to the efficiency of the existing encoding and decoding methods cannot be fully exerted when the reorganized atlas picture is sent to the traditional video encoder/decoder.

In order to solve the problems existing in related art and fully mine and utilize the similarity among multi-channel feature data, the present disclosure proposes a spatial feature data re-expression technology. The encoded feature data in this technology is feature data output from the intermediate layer of the neural network model. The general flow of the present disclosure is as follows. Original feature data is output from the intermediate layer of the neural network model, in general form (C, H, W), where C is the channel number of feature data, H is the height, and W is the width. The original feature data is re-expressed in spatial domain and encoded by an encoder to generate a bitstream; then the bitstream is decoded at the decoding end and subjected to an inverse expression to reconstruct and generate the original feature data, and the reconstructed original feature data is input back to the neural network model for task processing and analysis.

Figure 2:
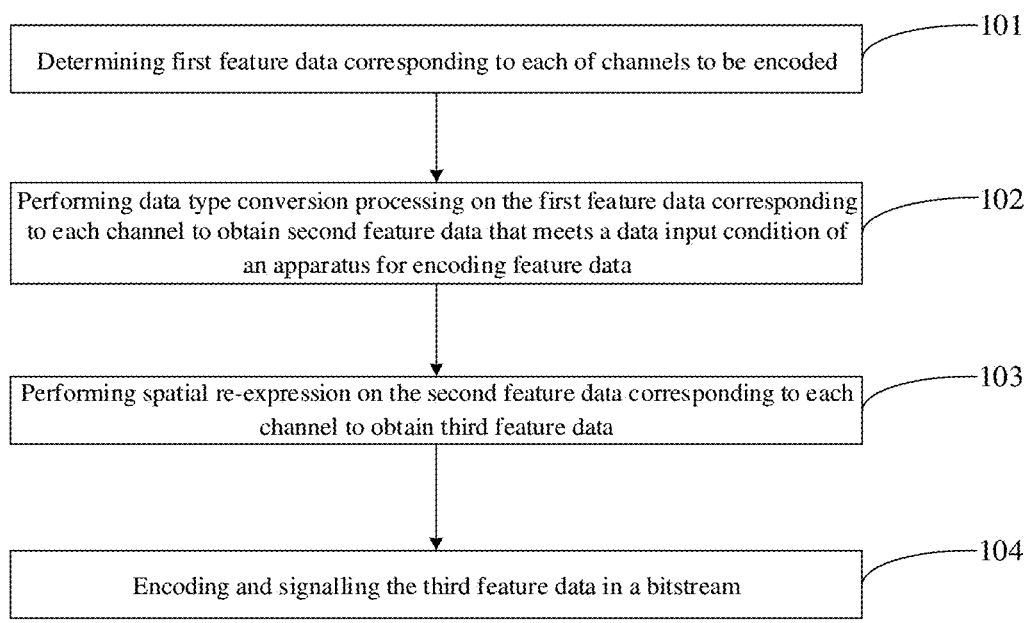
FIG. 2 is a first schematic flowchart of an exemplary method for encoding feature data provided by an embodiment of the present disclosure.

In an embodiment of the present disclosure, there is provided a method for encoding feature data, and the method for processing feature data is applied to an apparatus for encoding feature data. Referring to FIG. 2, the method includes the following operations.

At block 101, first feature data corresponding to each of channels to be encoded is determined.

In an embodiment of the present disclosure, the operation that the first feature data corresponding to each of the channels to be encoded is determined in block 101 may be realized by the following operations. A picture is acquired; and the first feature data corresponding to each channel of the picture is extracted.

In some embodiments, after acquiring the picture, the apparatus for encoding feature data inputs the picture into a neural network model, and then acquires the first feature data corresponding to each channel output by the intermediate layer of the neural network model. Here, the channels of the picture are feature maps of the picture, one channel is for detection of a certain feature, and the strength of a certain value in the channel reflects the strength of the current feature.

At block 102, data type conversion processing is performed on the first feature data corresponding to each channel to obtain second feature data that meets a data input condition of an apparatus for encoding feature data.

In an embodiment of the present disclosure, after an apparatus for processing feature data acquires the first feature data corresponding to each channel, since the data type of the first feature data does not meet the data input condition of the apparatus for encoding feature data, the apparatus for processing feature data performs data type conversion processing on the first feature data corresponding to each channel to obtain second feature data that meets the data input condition of an apparatus for encoding feature data.

Exemplarily, the first feature data is floating-point data and the second feature data is integer data.

At block 103, spatial re-expression is performed on the second feature data corresponding to each channel to obtain third feature data.

A height of the third feature data is a first height, a width of the third feature data is a first width, and the third feature data includes the second feature data located at a target position of each of the channels.

In the embodiments of the present disclosure, the apparatus for processing feature data processes the second feature data into third feature data with a height being the first height and a width being the first width by a spatial re-expression technique. Meanwhile, the third feature data includes second feature data located at a target position of each channel, that is, the second feature data is padded with the target size and the padding position is specified to ensure that there is only one feature data in a coding unit. The jump among data tends to be flat through the padding mode, thereby reducing the interaction of feature data among different channels during encoding.

At block 104, the third feature data is encoded and signalled in a bitstream.

In the method for processing feature data provided by the embodiments of the present disclosure, first feature data corresponding to each channel to be encoded is determined; data type conversion processing is performed on the first feature data corresponding to each channel to obtain second feature data that meets a data input condition of an apparatus for encoding feature data; spatial re-expression is performed on the second feature data corresponding to each channel to obtain third feature data, where a height of the third feature data is a first height, a width of the third feature data is a first width, and the third feature data includes the second feature data located at a target position of each of the channels; and the third feature data is encoded and signalled in a bitstream. That is to say, the second feature data is processed into third feature data with a height being the first height and a width being the first width by a spatial re-expression technique. Meanwhile, the third feature data includes the second feature data located at the target position of each channel, that is, the second feature data is padded with the target size and the padding position is specified to ensure that there is only one feature data in a coding unit. The jump among data tends to be flat through the above padding mode, which reduces the interaction of feature data among different channels during encoding, and avoids the occurrence of feature data of two channels in the same coding block when encoding the feature data, so as to efficiently utilize the existing video encoding and decoding standards, thereby improving the encoding efficiency of the feature data.

Figure 3:
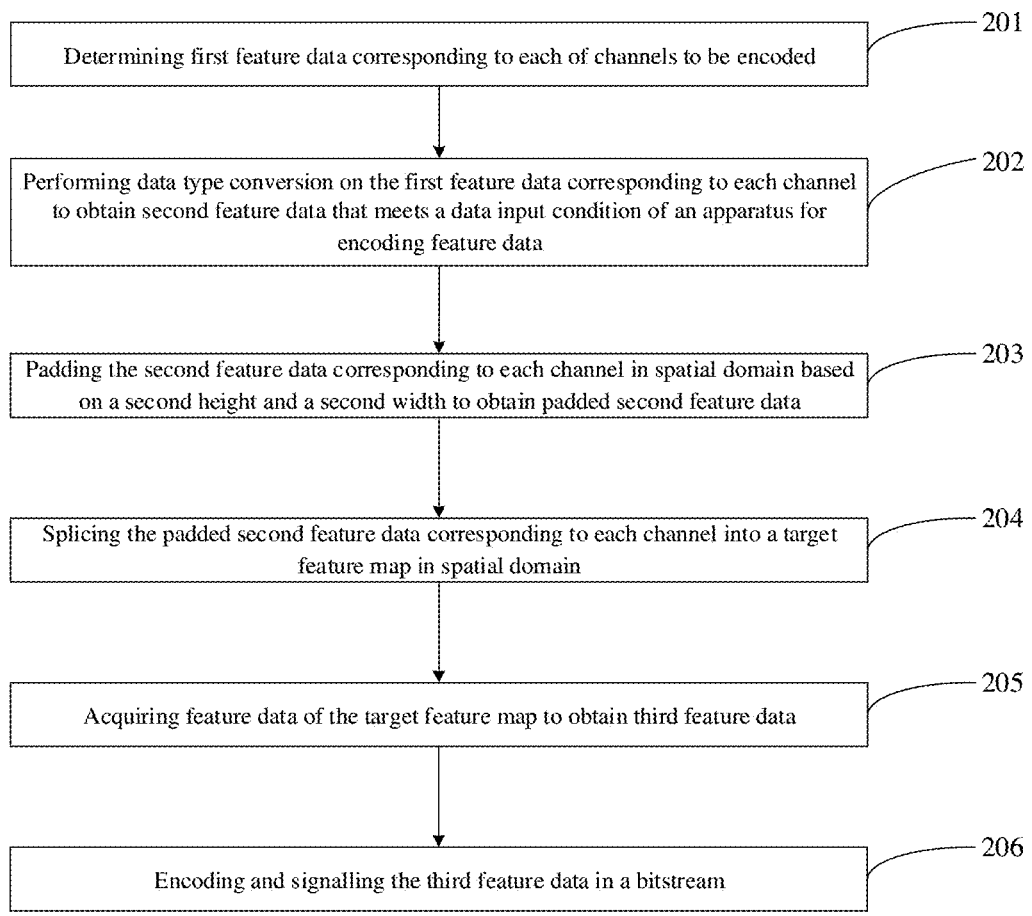
FIG. 3 is a second schematic flowchart of an exemplary method for encoding feature data provided by an embodiment of the present disclosure.

In an embodiment of the present disclosure, there is provided a method for encoding feature data, and the method for processing feature data is applied to an apparatus for encoding feature data. Referring to FIG. 3, the method includes the following operations.

At block 201, first feature data corresponding to each of channels to be encoded is determined.

At block 202, data type conversion processing is performed on the first feature data corresponding to each channel to obtain second feature data that meets a data input condition of an apparatus for encoding feature data.

In an embodiment of the present disclosure, the operation that data type conversion processing is performed on the first feature data corresponding to each channel to obtain second feature data that meets a data input condition of an apparatus for encoding feature data in block 202 may be realized by the following operation. Integer conversion processing is performed on the first feature data corresponding to each channel to obtain the second feature data that meets the data input condition of the apparatus for encoding feature data. The second feature data is integer data.

In some embodiments, integer conversion processing is performed on the first feature data based on following formula to obtain the second feature data, $$\hat{y}_{ij} = \text{int}\left[\frac{x_{ij} - x_{min}}{x_{max} - x_{min}} * (2^n - 1)\right],$$

where $x_{ij}$ is a feature value of row i and column j in the first feature data, $x_{min}$ is a minimum value in the first feature data, $x_{max}$ is a maximum value in the first feature data, $\hat{y}_{ij}$ is a feature value of row i and column j in the second feature data, n is a bit number, and int[ ] is an integer function.

In other embodiments, integer conversion processing is performed on the first feature data based on following formula to obtain the second feature data, $$\hat{y}_{ij} = \text{int}\left[\frac{\log_2(1 + x_{ij})}{\max\_num} \times (2^{BitDepth} - 1)\right],$$

where $\hat{y}_{ij}$ is a feature value of row i and column j in the second feature data, $x_{ij}$ is a feature value of row i and column j in the first feature data, int[ ] is an integer function, $\log_2$( ) returns a logarithm of an input to base 2, max_num is a maximum value of feature data $\log_2(1+x_{ij})$ after logarithmic transformation, and BitDepth is a fixed-point bit number.

At block 203, the second feature data corresponding to each channel is padded in spatial domain based on the second height and the second width to obtain the padded second feature data.

The first height is an integer multiple of the second height, and the first width is an integer multiple of the second width.

In other embodiments of the present disclosure, the operation that the second feature data corresponding to each channel is padded in spatial domain based on a second height and a second width to obtain padded second feature data in block 203 may be realized by the following operation. The second feature data corresponding to each channel is padded in spatial domain based on the target position, the second height and the second width to obtain the padded second feature data.

In an embodiment of the present disclosure, different channels have the same target positions. The target positions are initial positions of the padded second feature data of different channels in the channels, or the target positions are middle positions of the padded second feature data of the different channels in the channels.

Here, padding the second feature data corresponding to each channel in spatial domain based on a second height and a second width to obtain padded second feature data in block 203 may be called spatial placement. That is, the feature data of each channel is padded to a fixed size in spatial domain, where the feature data is placed at a specific position of the padded feature data. For example, the feature data of each channel may be placed at initial positions of the padded feature data, i.e. position (0, 0), and the feature data is padded to a specific size on the right and bottom of the feature data.

At block 204, the padded second feature data corresponding to each channel are spliced into a target feature map in spatial domain.

The target feature map has the first height and the first width.

Here, the operation that the padded second feature data corresponding to each channel are spliced into a target feature map in spatial domain in block 204 may be called spatial splicing. That is, the padded feature data are spliced into a whole large feature map in spatial domain as shown in FIG. 4, and then the re-expressed feature data, i.e., the third feature data is obtained.

Figure 4:
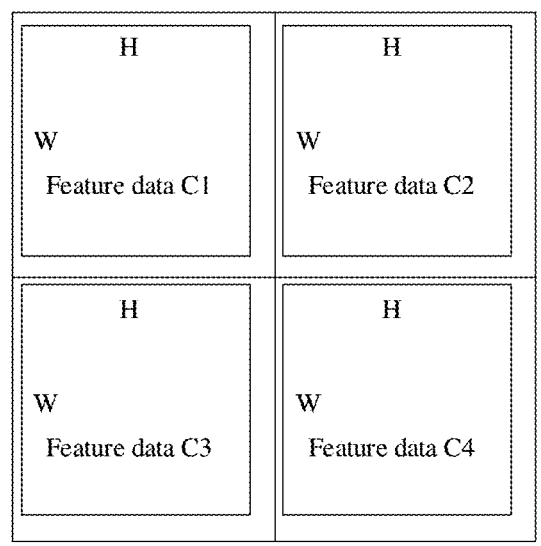
FIG. 4 is a schematic diagram of an exemplary spatial placement and spatial splicing provided by an embodiment of the present disclosure.

Here, a brief description is made to FIG. 4. The input of the neural network model is a picture, and the output of the intermediate layer is a plurality of feature maps. The size of feature value in a feature map indicates whether there is a certain feature in a certain position. When the original feature data is obtained, there will be a jump between the lower half of C1 and the upper half of C3. Assuming that the size of the original feature data corresponding to C1 is 13*17, it is padded to an integer multiple of 8*8, such as 64*64. Here, it can be padded based on gradual mode or copying mode of pixel value at the rightmost or bottommost of C1, ensuring that C1 and C2 or C3 and C4 are completely independent. Finally, the feature data is placed in the position with the highest encoding efficiency, such as in the upper-left position and in the exact middle position. Exemplarily, as shown in FIG. 4, the padded second feature data includes (C1, H, W), (C2, H, W), (C3, H, W), and (C4, H, W). It can be seen that the padded second feature data is a data block of the same size, that is, data blocks of the same size are encoded in the present disclosure.

At block 205, feature data of the target feature map is acquired to obtain the third feature data.

A height of the third feature data conforms to a first height, a width of the third feature data conforms to a first width, and the third feature data includes the second feature data located at a target position of each of the channels.

At block 206, the third feature data is encoded, and signalled in a bitstream.

Figure 5:
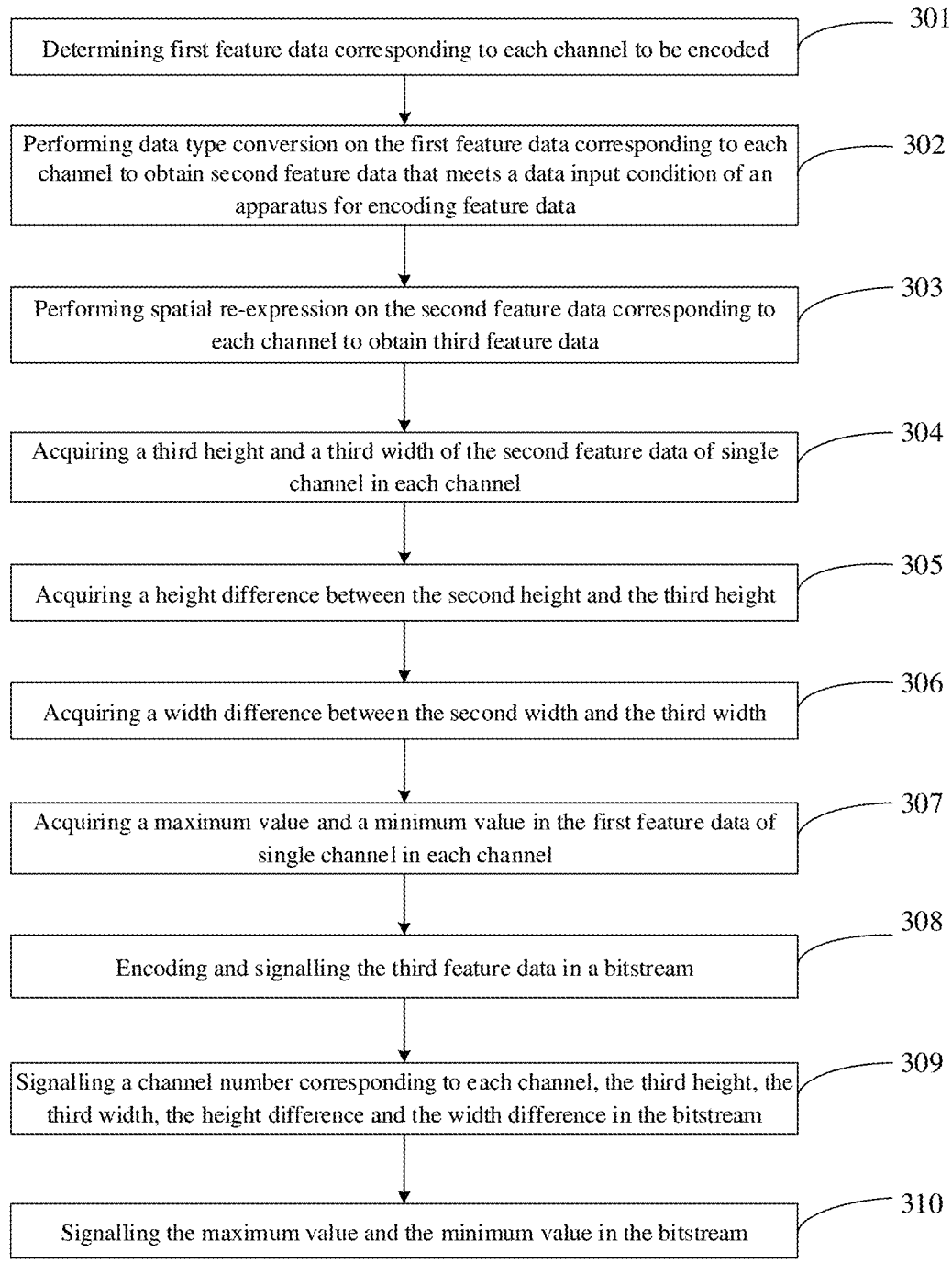
FIG. 5 is a third schematic flowchart of an exemplary method for encoding feature data provided by an embodiment of the present disclosure.

In an embodiment of the present disclosure, there is provided a method for encoding feature data, where the method for encoding feature data is applied to an apparatus for encoding feature data. Referring to FIG. 5, the method includes the following operations.

At block 301, first feature data corresponding to each of channels to be encoded is determined.

At block 302, data type conversion processing is performed on the first feature data corresponding to each channel to obtain second feature data that meets a data input condition of an apparatus for encoding feature data.

At block 303, spatial re-expression is performed on the second feature data corresponding to each channel to obtain third feature data.

A height of the third feature data conforms to a first height, a width of the third feature data conforms to a first width, and the third feature data includes the second feature data located at a target position of each of the channels.

At block 304, a third height and a third width of the second feature data of single channel in each channel is acquired.

Here, although the second feature data and the first feature data are data of different data types, the second feature data and the first feature data have the same height and width, that is, the first feature data has a third height and a third width.

At block 305, a height difference between the second height and the third height is acquired.

At block 306, a width difference between the second width and the third width is acquired.

At block 307, a maximum value and a minimum value in the first feature data of single channel of the channels is acquired.

Here, the maximum value and minimum value in the second feature data are different from those in the first feature data.

At block 308, the third feature data is encoded, and signalled in a bitstream.

At block 309, a channel number corresponding to each channel, the third height, the third width, the height difference value and the width difference value are signalled in the bitstream.

Here, the height difference and the width difference are used as reference factors for the apparatus for decoding feature data to perform spatial splitting, and are signalled in the bitstream in the encoding process, so that the data transmission number can be reduced and the encoding efficiency can be improved.

At block 310, the maximum value and the minimum value are signalled in the bitstream.

Figure 6:
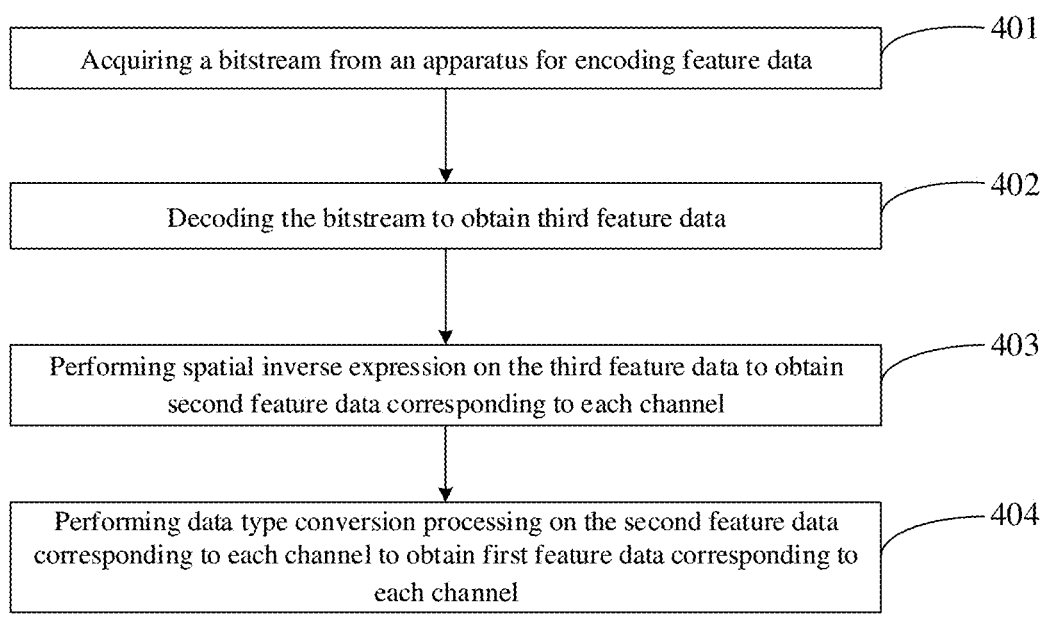
FIG. 6 is a first schematic flowchart of an exemplary method for decoding feature data provided by an embodiment of the present disclosure.

In an embodiment of the present disclosure, there is provided a method for decoding feature data, where the method for decoding feature data is applied to an apparatus for decoding feature data. Referring to FIG. 6, the method includes the following operations.

At block 401, a bitstream from an apparatus for encoding feature data is acquired.

At block 402, the bitstream is encoded to obtain third feature data.

At block 403, spatial inverse expression is performed on the third feature data to obtain second feature data corresponding to each of channels.

A height of the third feature data conforms to a first height, a width of the third feature data conforms to a first width, and the third feature data includes the second feature data located at a target position of each of the channels.

At block 404, data type conversion processing is performed on the second feature data corresponding to each channel to obtain first feature data corresponding to each channel.

Here, after acquiring a picture, the apparatus for encoding feature data inputs the picture into a neural network model, and then acquires the original feature data output by the intermediate layer of the neural network model. Further, the apparatus for encoding feature data performs spatial re-expression the original feature data and generates a bitstream by encoding through encoder. Then, the apparatus for decoding feature data obtains the bitstream, decodes it, and then performs inverse expression to reconstruct the original feature data, and inputs the reconstructed original feature data back to the neural network model for task processing and analysis.

It should be noted that in the present disclosure, the first feature data (i.e., original feature data) acquired by the apparatus for encoding feature data and the first feature data (i.e., the reconstructed feature data) reconstructed by the apparatus for decoding feature data are ideally identical or have certain differences. Here, the reason for the difference is that the apparatus for decoding feature data reconstructs based on the encoded bitstream, but the bitstream will introduce distortion after encoding, so there will be a certain difference between the original feature data and the reconstructed feature data.

In the method for decoding feature data provided by the embodiments of the present disclosure, a bitstream from an apparatus for encoding feature data is acquired; the bitstream is decoded to obtain third feature data; spatial inverse expression is performed on the third feature data to obtain second feature data corresponding to each channel, where a height of the third feature data conforms to a first height, a width of the third feature data conforms to a first width, and the third feature data includes the second feature data located at target positions of each channel; and data type conversion processing is performed on the second feature data corresponding to each channel to obtain first feature data corresponding to each channel. That is to say, the third feature data obtained by decoding is processed and restored to the second feature data corresponding to each channel through the spatial inverse expression technology, and the data type conversion processing is performed on the second feature data corresponding to each channel to obtain the first feature data corresponding to each channel output by the intermediate layer of the neural network model, thereby reducing the interaction of feature data among different channels during encoding, and avoiding the occurrence of feature data of two channels in the same coding block when encoding the feature data, so as to efficiently utilize the existing video encoding and decoding standards. Therefore, on the basis of improving the encoding efficiency of feature data, the encoded data can be decoded quickly and accurately, and thus the original feature data corresponding to each channel output by the intermediate layer of the neural network model can be obtained.

Figure 7:
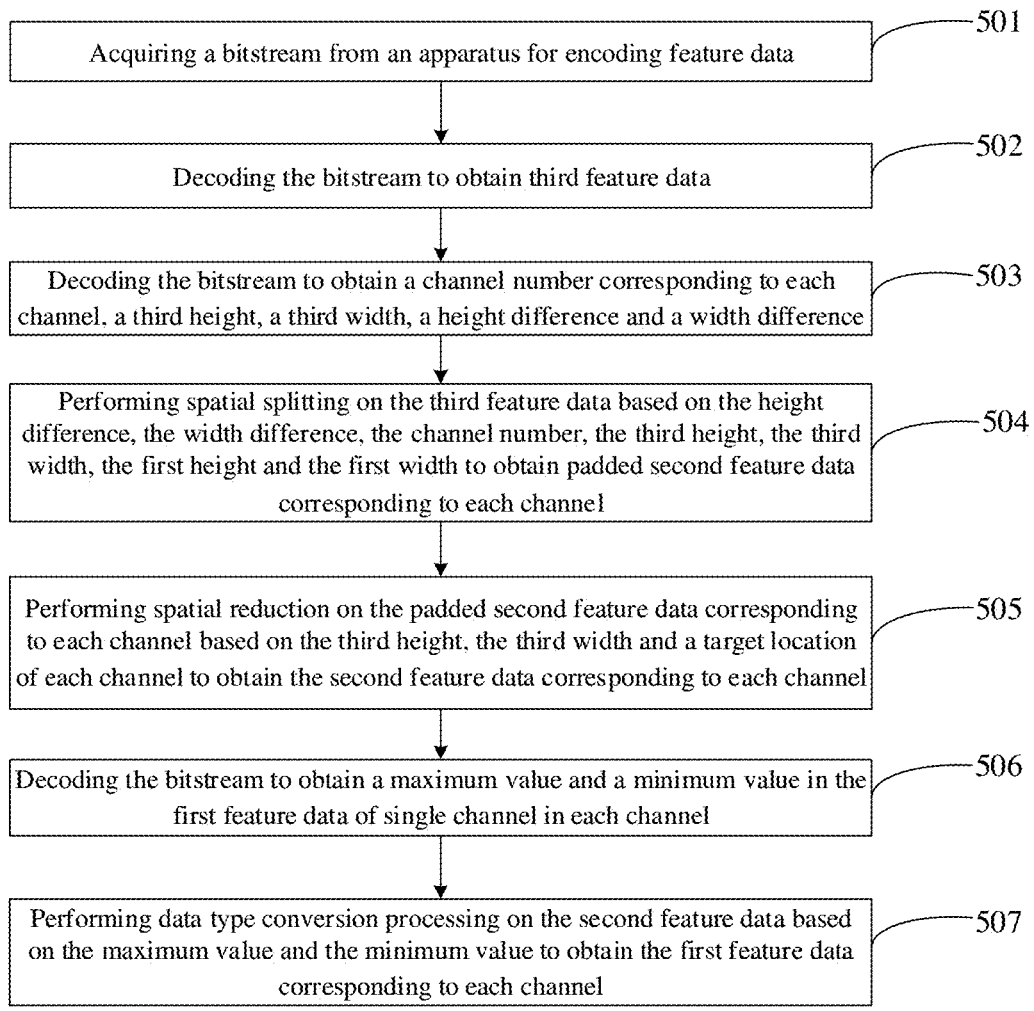
FIG. 7 is a second schematic flowchart of an exemplary method for decoding feature data provided by an embodiment of the present disclosure.

In an embodiment of the present disclosure, there is provided a method for decoding feature data, where the method for decoding feature data is applied to an apparatus for decoding feature data. Referring to FIG. 7, the method includes the following operations.

At block 501, a bitstream from an apparatus for encoding feature data is acquired.

At block 502, the bitstream is decoded to obtain third feature data.

At block 503, the bitstream is decoded to obtain a channel number corresponding to each channel, a third height, a third width, a height difference and a width difference.

The second feature data has the third height and the third width, the height difference is a difference between the second height and the third height of padded second feature data, and the width difference is a difference between the second width and the third width of the padded second feature data.

At block 504, spatial splitting is performed on the third feature data based on the height difference, the width difference, the channel number, the third height, the third width, the first height and the first width to obtain padded second feature data corresponding to each channel.

Here, no matter what splicing method is used by the apparatus for encoding feature data to process the padded second feature data to obtain the third feature data, at the side of the apparatus for decoding feature data, spatial splitting may be performed on the third feature data based on the resolution of the third feature data (namely the first height and the first width), the height difference, the width difference, the channel number, the third height and the third width, to obtain the padded second feature data corresponding to each channel.

For example, the channel number is 4, and the padded second feature data of the 4 channels includes (C1, H'+H, W'+W), (C2, H'+H, W'+W), (C3, H'+H, W'+W) and (C4, H'+H, W'+W) respectively.

At block 505, spatial pruning is performed on the padded second feature data corresponding to each channel based on the third height, the third width and the target positions of each channel to obtain the second feature data corresponding to each channel.

A height of the third feature data conforms to a first height, a width of the third feature data conforms to a first width, and the third feature data includes the second feature data located at target positions of the channels.

Here, the second feature data may be reduced from the padded second feature data based on the third height and the third width starting from the target position.

At block 506, the bitstream is decoded to obtain a maximum value and a minimum value in the first feature data of single channel in each channel.

At block 507, data type conversion processing is performed on the second feature data based on the maximum value and the minimum value to obtain the first feature data corresponding to each channel.

In other embodiments of the present disclosure, the operation that data type conversion processing is performed on the second feature data based on the maximum value and the minimum value to obtain the first feature data corresponding to each channel may be realized by the following operation. Floating-point conversion processing is performed on the second feature data based on the maximum value and the minimum value to obtain the first feature data corresponding to each channel, where the first feature data is floating-point data.

In some embodiments, floating-point conversion processing is performed on the second feature data based on following formula to obtain the first feature data, $$x_{ij} = \frac{\hat{y}_{ij}(x_{max} - x_{min})}{2^n - 1} + x_{min},$$

where $x_{ij}$ is a feature value of row i and column j in the first feature data, $x_{min}$ is a minimum value in the first feature data, $x_{max}$ is a maximum value in the first feature data, $\hat{y}_{ij}$ is a feature value of row i and column j in the second feature data, and n is a bit number.

In other embodiments, floating-point conversion processing is performed on the second feature data based on following formula to obtain the first feature data, $$x_{ij} = 2^{\left(\frac{x_{max}}{2^{(BitDepth)}-1} \times float(\hat{y}_{ij})-1\right)},$$

where $x_{ij}$ is a feature value of row i and column j in the first feature data, $\hat{y}_{ij}$ is a feature value of row i and column j in the second feature data, $x_{max}$ is a maximum value in the first feature data, BitDepth is a fixed-point bit number, and float( ) converts the input integer data into floating-point data.

Figure 8:
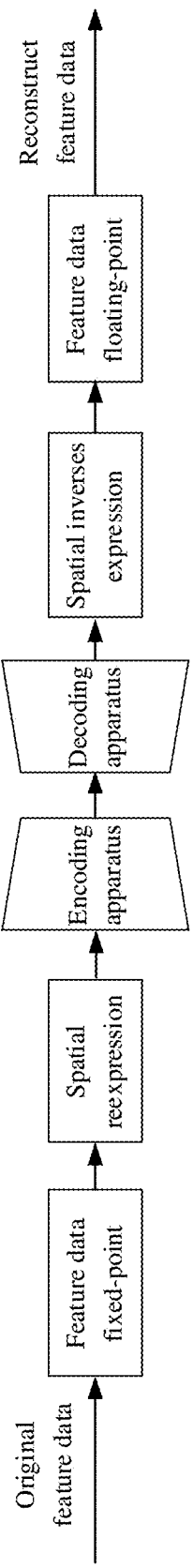
FIG. 8 is a schematic flowchart of an exemplary method for processing feature data in encoding and decoding scenario provided by an embodiment of the present disclosure.

In an implementable scenario, as shown in FIG. 8, the method for encoding and decoding feature data provided by the present disclosure is further explained. The first feature data encoded in the present disclosure is also called original feature data, which is the feature data output from the intermediate layer of the neural network model. The original feature data is output from the intermediate layer of the neural network model and is generally in the form of (C, H, W), where C is the channel number of feature data, H is the height, and W is the width. In the method for processing feature data of the present disclosure, after obtaining the original feature data, feature data fixed-point is performed on the original feature data. Then, spatial re-expression is performed on the original feature data after fixed-point, where the spatial re-expression includes spatial placement and spatial splicing, and then a bitstream is generated by encoding by the encoding apparatus. The decoding apparatus decodes and performs spatial inverse expression on the bitstream, and performs feature data floating-point to reconstruct the feature data. The reconstructed feature data is input back to the neural network model for task processing and analysis.

Furthermore, the method for processing feature data is described in detail.

The spatial placement is technically implemented as that: the feature data of each channel is padded to a fixed size in spatial domain, where the feature data is placed at a specific position of the padded feature data. For example, the feature data of each channel may be placed at position (0, 0) of the padded feature data, and is padded to a specific size on the right and bottom of the feature data.

to the difference H' between the padding height and the original height H of the single channel feature data, the difference W' between the padding width and the original width W of the single channel feature data, the channel number C, and the resolution W1×H1 of the spliced large feature map. The spatial pruning includes: performing spatial pruning according to the spatial placement initial coordinates of the single channel feature data in the padded feature data, the height H and width W of the single channel feature data to obtain the reduced feature data (C, H, W).

In an implementation, spatial re-expression information of feature data may be recorded in supplemental enhancement information (SEI) (e.g. H.265/HEVC SEI, H.266/VVC SEI or AVS extension data). For example, in sei_paylod( ) of sei_message( ) in sei_rbsp( ) of AVC/HEVC/VVC/EVC, if a new category of SEI, i.e., feature map spatial re-expression indication SEI message is added to the table, payloadType may be defined as any serial number not used by other SEIs, such as 184. In this case, the syntax structure is shown in Table 1.

TABLE 1-1

| syntax structure of sei_payload( ) | |
| --- | --- |
| sei_payload( payloadType, payloadSize ) {<br>  if( nal_unit_type = = PREFIX_SEI_NUT ) {<br>    if( payloadType = = 0 )<br>      buffering_period( payloadSize )<br>    ...<br>    if( payloadType = = 184 )<br>      feature_map_spatial_reexpression_indication ( payloadSize )<br>  }<br>}<br>feature_map_spatial_reexpression_indication ( payloadSize ) {<br>  feature_channel_number<br>  feature_height<br>  feature_width<br>  feature_height_difference<br>  feature_width_difference<br>  feature_padding_initial_position_y<br>  feature_padding_initial_position_x<br>} | Descriptor<br><br><br><br><br><br><br><br><br><br>Descriptor<br>ue(v)<br>ue(v)<br>ue(v)<br>ue(v)<br>ue(v)<br>ue(v)<br>ue(v) |

The spatial splicing is technically implemented as: the padded feature data is spliced into a whole large feature map in spatial domain as shown in FIG. 4, and the re-expressed feature data is obtained.

In the embodiments of the present disclosure, in addition to the bitstream information generated after the traditional video encoding, it is also required to transmit at least the following additional information: spatial placement initial coordinates of single channel feature data in the padded feature data; height H, width W and channel number C of single channel feature data; the difference H' between the padding height and the original height H of the single channel feature data, and the difference W' between the padding width and the original width W of the single channel feature data. Other additional data include: the size of a picture input in a network, called picture_size; the size of the picture after processing by the network, called processed_picture_size; the maximum value $x_{max}$ and the minimum value $x_{min}$ of the original feature data in each channel.

After the decoding end obtains the feature data bitstream, the corresponding feature data needs to be reconstructed through spatial splitting and spatial pruning. The specific steps are as follows. The spatial splitting includes: performing spatial splitting on the decoded re-expression feature data into feature data of multiple channels. Specifically, the feature data is partitioned into (C, H'+H, W'+W) according The semantics of syntax elements are:
feature_channel_number: it is used to describe that the channel number of feature data is feature_channel_number+1;
feature_height: it is used to describe that the height of single channel feature data is feature_height+1;
feature_width: it is used to describe that the width of single channel feature data is feature_width+1;
feature_height_difference: it is used to describe that the difference between the padding height and the original height of single channel feature data is feature_height_difference;
feature_width_difference: it is used to describe that the difference between the padding width and the original width of single channel feature data is feature_width_difference;
feature_padding_initial_position_y: it is used to describe that the initial ordinate of spatial placement of the channel feature data in the padded feature data is feature_padding_initial_position_y;
feature_padding_initial_position_x: it is used to describe that the initial abscissa of spatial placement of the channel feature data in the padded feature data is feature_padding_initial_position_x.

The spatial re-expression of feature data may include a feature data fixed-point step before it and an encoding step after it.

In the spatial re-expression of feature data and encoding process, the specific steps of performing fixed-point and floating-point processing on the feature data are as follows.

In fixed-point processing of feature data, for example, by scaling the feature data of each channel and storing $x_{min}$ and $x_{max}$, this data may be transmitted to the decoding end for post-processing. The quantization formula is as follows:

$$\hat{y}_{ij} = \text{int}\left[\frac{x_{ij} - x_{min}}{x_{max} - x_{min}} * (2^n - 1)\right]$$

where $x_{ij}$ is a feature value of row i and column j in the unquantized feature data (H, W), $x_{min}$ is a minimum value in the feature data, $x_{max}$ is a maximum value in the feature data, $\hat{y}_{ij}$ is a feature value of row i and column j in the fixed-point feature data (H, W), n is a bit number, and int[ ] is an integer function.

In floating-point processing of feature data, the floating-point processing is performed on the reduced feature data to obtain reconstructed feature data. For example, floating-point processing may be performed according to $x_{max}$ and $x_{min}$, and the floating-point formula is as follows:

$$x_{ij} = \frac{\hat{y}_{ij}(x_{max} - x_{min})}{2^n - 1} + x_{min}$$

where $x_{ij}$ is a feature value of row i and column j in the feature data (H, W) not subjected to fixed-point, $x_{min}$ is a minimum value in the feature data, $x_{max}$ is a maximum value in the feature data.

Exemplary, in an application scenario embodiment, for face recognition scenario, picture acquisition equipment collects portraits in railway stations and other places, inputs the portraits into a neural network model for face recognition. For example, the neural network model has 10 layers, and only 5 layers may be executed because the local computing power of the picture acquisition equipment is not enough. After outputting the original feature data by an intermediate layer of the neural network model, the picture acquisition equipment performs feature data fixed-point processing on the original feature data, and obtains second feature data that meets a data input condition of an apparatus for encoding feature data. Further, the picture acquisition equipment processes the second feature data into third feature data having a height conforming to the first height and a width conforming to the first width by a spatial re-expression technique. The third feature data includes second feature data located at target positions of each channel, that is, the second feature data is padded with the target size and the padding position is specified to ensure that there is only one feature data in a coding unit. The jump among data tends to be flat through the above padding mode. Further, the picture acquisition equipment transmits the third feature data to an apparatus for processing feature data, which encodes and signals the third feature data in the bitstream. Thereafter, the apparatus for processing feature data transmits the bitstream to an apparatus for processing feature data, where the apparatus for processing feature data may be arranged in the cloud server, that is, after obtaining the bitstream, it is handed over to the cloud for processing. The cloud server decodes the bitstream through the apparatus for processing feature data to obtain the third feature data, and then the cloud server performs spatial inverse expression on the third feature data, including spatial splitting and spatial pruning, to obtain the second feature data corresponding to each channel. Then, the cloud server performs floating-point processing on the second feature data of each channel to obtain the first feature data corresponding to each channel Finally, the cloud server inputs the first feature data corresponding to each channel to the sixth layer of the neural network, and continuously executes it to the tenth layer to obtain the face recognition result.

The present disclosure has at least the following beneficial effects: spatial feature data re-expression technology can reduce the interaction of feature data among different channels during encoding, and avoid the occurrence of feature data of two channels in the same coding block when encoding feature data, so as to make efficient use of existing video encoding and decoding standards, thereby improving the encoding efficiency of feature data. By introducing additional information into the bitstream and introducing spatial feature data re-expression technology, the feature data are spatial placed and spatial spliced to improve the encoding efficiency of feature data.

Figure 9:
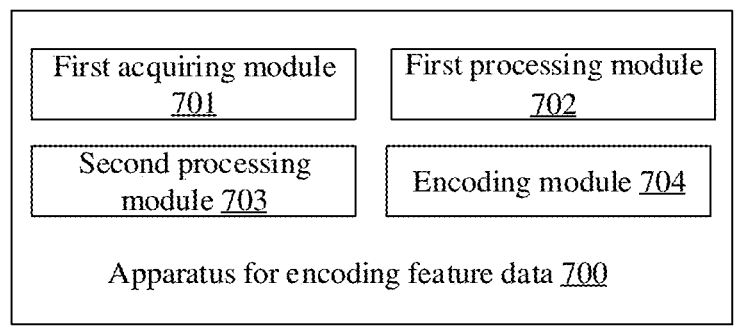
FIG. 9 is a structural diagram of an apparatus for encoding feature data provided by an embodiment of the present disclosure.

FIG. 9 is a composition structural diagram of an apparatus for encoding feature data provided by an embodiment of the present disclosure. As shown in FIG. 9, the apparatus for encoding feature data 700 corresponding to a device includes a first acquiring module 701, a first processing module 702, a second processing module 703 and an encoding module 704.

The first acquiring module 701 is configured to determine first feature data corresponding to each of channels to be encoded.

The first processing module 702 is configured to perform data type conversion processing on the first feature data corresponding to each channel to obtain second feature data that meets a data input condition of an apparatus for encoding feature data.

The second processing module 703 is configured to perform spatial re-expression on the second feature data corresponding to each channel to obtain third feature data, where a height of the third feature data conforms to a first height, a width of the third feature data conforms to a first width, and the third feature data includes the second feature data located at a target position of each of the channels.

The encoding module 704 is configured to encode and signal the third feature data in a bitstream.

In other embodiments of the present disclosure, the second processing module 703 is configured to: pad the second feature data corresponding to each channel in spatial domain based on a second height and a second width to obtain padded second feature data, where the first height is an integer multiple of the second height, and the first width is an integer multiple of the second width; splice the padded second feature data corresponding to each channel into a target feature map in spatial domain, where the target feature map has the first height and the first width; and acquire feature data of the target feature map to obtain the third feature data.

In other embodiments of the present disclosure, the second processing module 703 is configured to: pad the second feature data corresponding to each channel in spatial domain based on the target position, the second height and the second width to obtain the padded second feature data.

In other embodiments of the present disclosure, different channels have same target positions.

In other embodiments of the present disclosure, the target positions are initial positions of the padded second feature data of different channels in the channels, or the target positions are middle positions of the padded second feature data of the different channels in the channels.

In other embodiments of the present disclosure, the first acquiring module 701 is configured to acquire a third height and a third width of the second feature data of single channel in each channel; acquire a height difference between the second height and the third height; and acquire a width difference between the second width and the third width.

In other embodiments of the present disclosure, the encoding module 704 is configured to signal a channel number corresponding to each channel, the third height, the third width, the height difference and the width difference value corresponding to each channel in the bitstream.

In other embodiments of the present disclosure, the first acquiring module 701 is configured to acquire a maximum value and a minimum value in the first feature data of single channel in each channel.

In other embodiments of the present disclosure, the encoding module 704 is configured to signal the maximum value and the minimum value in the bitstream.

In other embodiments of the present disclosure, the first processing module 702 is configured to perform integer conversion processing on the first feature data corresponding to each channel to obtain the second feature data that meets the data input condition of the apparatus for encoding feature data, where the second feature data is integer data.

In other embodiments of the present disclosure, the first processing module 702 is configured to perform integer conversion processing on the first feature data based on following formula to obtain the second feature data, $$\hat{y}_{ij} = \text{int}\left[\frac{x_{ij} - x_{min}}{x_{max} - x_{min}} * (2^n - 1)\right],$$

where $x_{ij}$ is a feature value of row i and column j in the first feature data, $x_{min}$ is a minimum value in the first feature data, $x_{max}$ is a maximum value in the first feature data, $\hat{y}_{ij}$ is a feature value of row i and column j in the second feature data, n is a bit number, and int[ ] is an integer function.

In other embodiments of the present disclosure, the first processing module 702 is configured to perform integer conversion processing on the first feature data based on following formula to obtain the second feature data, $$\hat{y}_{ij} = \text{int}\left[\frac{\log_2(1 + x_{ij})}{\max\_num} \times (2^{BitDepth} - 1)\right],$$

where $\hat{y}_{ij}$ is a feature value of row i and column j in the second feature data, $x_{ij}$ is a feature value of row i and column j in the first feature data, int[ ] is an integer function, $\log_2$( ) returns a logarithm of an input to base 2, max_num is a maximum value of feature data $\log_2(1+D)$ after logarithmic transformation, and BitDepth is a fixed-point bit number.

In other embodiments of the present disclosure, the first acquiring module 701 is configured to: acquire a picture; and extract the first feature data corresponding to each of channels of the picture.

In the apparatus for encoding feature data provided by the embodiments of the present disclosure, first feature data corresponding to each channel to be encoded is determined; data type conversion processing is performed on the first feature data corresponding to each channel to obtain second feature data that meets a data input condition of an apparatus for encoding feature data; spatial re-expression is performed on the second feature data corresponding to each channel to obtain third feature data, where a height of the third feature data conforms to a first height, a width of the third feature data conforms to a first width, and the third feature data includes the second feature data located at target positions of the channels; and the third feature data is encoded and signalled in a bitstream. That is to say, the second feature data is processed into third feature data having a height conforming to the first height and a width conforming to the first width by a spatial re-expression technique. Meanwhile, the third feature data includes second feature data located at the target position of each channel, that is, the second feature data is padded with the target size and the padding position is specified to ensure that there is only one feature data in a coding unit. The jump among data tends to be flat through the above padding mode, which reduces the interaction of feature data among different channels during encoding, and avoids the occurrence of feature data of two channels in the same coding block when encoding the feature data, so as to efficiently utilize the existing video encoding and decoding standards, thereby improving the encoding efficiency of the feature data.

Figure 10:
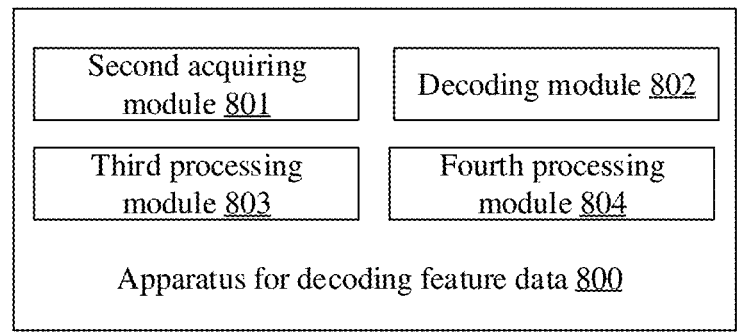
FIG. 10 is a structural diagram of an apparatus for decoding feature data provided by an embodiment of the present disclosure.

FIG. 10 is a composition structural diagram of an apparatus for decoding feature data provided by an embodiment of the present disclosure. As shown in FIG. 10, the apparatus for decoding feature data 800 corresponding to a cloud server includes a second acquiring module 801, a decoding module 802, a third processing module 803 and a fourth processing module 804.

The second acquiring module 801 is configured to acquire a bitstream from an apparatus for encoding feature data.

The decoding module 802 is configured to decode the bitstream to obtain third feature data.

The third processing module 803 is configured to perform spatial inverse expression on the third feature data to obtain second feature data corresponding to each of channels, where a height of the third feature data conforms to a first height, a width of the third feature data conforms to a first width, and the third feature data includes the second feature data located at a target position of each of the channels.

The fourth processing module 804 is configured to perform data type conversion processing on the second feature data corresponding to each channel to obtain first feature data corresponding to each channel.

In other embodiments of the present disclosure, the decoding module 802 is configured to: decode the bitstream to obtain a channel number corresponding to each channel, a third height, a third width, a height difference value and a width difference, where the second feature data has the third height and the third width, the height difference is a difference between the second height and the third height of padded second feature data, and the width difference is a difference between the second width and the third width of the padded second feature data.

In other embodiments of the present disclosure, the third processing module 803 is configured to perform spatial splitting on the third feature data based on the height difference, the width difference, the channel number, the third height, the third width, the first height and the first width to obtain padded second feature data corresponding to each channel; and perform spatial pruning on the padded second feature data corresponding to each channel based on the third height, the third width and the target positions of each channel to obtain the second feature data corresponding to each channel.

In other embodiments of the present disclosure, the decoding module 802 is configured to decode the bitstream to obtain a maximum value and a minimum value in the first feature data of single channel in each channel.

In other embodiments of the present disclosure, the fourth processing module 804 is configured to perform data type conversion processing on the second feature data based on the maximum value and the minimum value to obtain the first feature data corresponding to each channel.

In other embodiments of the present disclosure, the fourth processing module 804 is configured to perform floating-point conversion processing on the second feature data based on the maximum value and the minimum value to obtain the first feature data corresponding to each channel, where the first feature data is floating-point data.

In other embodiments of the present disclosure, the fourth processing module 804 is configured to perform floating-point conversion processing on the second feature data based on the following formula to obtain the first feature data, $$x_{ij} = \frac{\hat{y}_{ij}(x_{max} - x_{min})}{2^n - 1} + x_{min},$$

where $x_{ij}$ is a feature value of row i and column j in the first feature data, $x_{min}$ is a minimum value in the first feature data, $x_{max}$ is a maximum value in the first feature data, $\hat{y}_{ij}$ is a feature value of row i and column j in the second feature data, and n is a bit number.

In other embodiments of the present disclosure, the fourth processing module 804 is configured to perform floating-point conversion processing on the second feature data based on the following formula to obtain the first feature data, $$x_{ij} = 2^{\left(\frac{x_{max}}{(2^{BitDepth})-1} \times float(\hat{y}_{ij})-1\right)},$$

where $x_{11}$ is a feature value of row i and column j in the first feature data, $\hat{y}_{ij}$ is a feature value of row i and column j in the second feature data, max_num is a maximum value of feature data $\log_2(1+x_{ij})$ after logarithmic transformation, BitDepth is a fixed-point bit number, and float( ) converts the input integer data into floating-point data.

In the apparatus for decoding feature data provided by the embodiments of the present disclosure, a bitstream from an apparatus for encoding feature data is acquired; the bitstream is decoded to obtain third feature data; spatial inverse expression is performed on the third feature data to obtain second feature data corresponding to each channel, where a height of the third feature data conforms to a first height, a width of the third feature data conforms to a first width, and the third feature data includes the second feature data located at a target position of each channel; and data type conversion processing is performed on the second feature data corresponding to each channel to obtain first feature data corresponding to each channel. That is to say, the third feature data obtained by decoding is processed and restored to the second feature data corresponding to each channel through the spatial inverse expression technology, and the data type conversion processing is performed on the second feature data corresponding to each channel to obtain the first feature data corresponding to each channel output by the intermediate layer of the neural network model, thereby reducing the interaction of feature data among different channels during encoding, and avoiding the occurrence of feature data of two channels in the same coding block when encoding the feature data, so as to efficiently utilize the existing video encoding and decoding standards. Therefore, on the basis of improving the encoding efficiency of feature data, the encoded data can be decoded quickly and accurately, and thus the original feature data corresponding to each channel output by the intermediate layer of the neural network model can be obtained.

Figure 11:
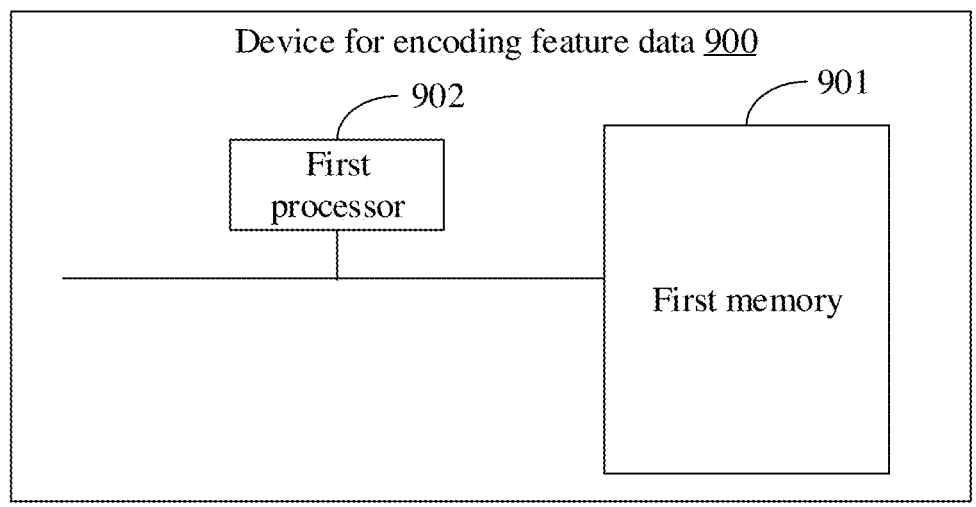
FIG. 11 is a structural diagram of a device for encoding feature data provided by an embodiment of the present disclosure.

In a practical application, as shown in FIG. 11, in an embodiment of the present disclosure, there is also provided a device for encoding feature data 900, including a first memory 901 and a first processor 902.

The first memory 901 is configured to store encoded instructions of executable feature data.

The first processor 902 is configured to execute the encoded instructions of the executable feature data stored in the first memory to implement the method for encoding feature data provided by the embodiments in the present disclosure.

The first processor may be implemented by software, hardware, firmware or a combination thereof, circuits, single or multiple application specific integrated circuits (ASIC), single or multiple general purpose integrated circuits, single or multiple microprocessors, single or multiple programmable logic devices, or combinations of the foregoing circuits or devices, or other suitable circuits or devices can be used, so that the processor can execute the corresponding operations of the method for encoding feature data in the embodiments of the apparatus for processing feature data corresponding to the aforementioned device.

Figure 12:
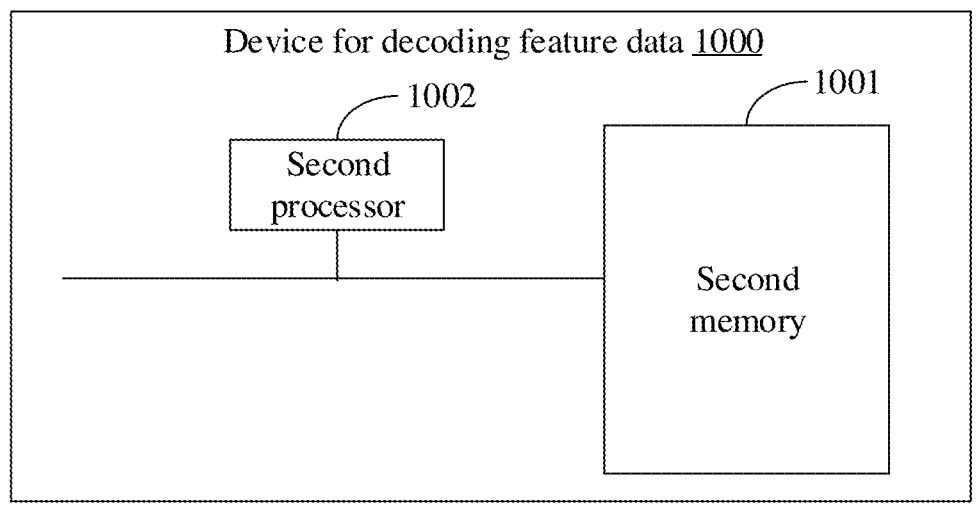
FIG. 12 is a structural diagram of a device for decoding feature data provided by an embodiment of the present disclosure.

In a practical application, as shown in FIG. 12, in an embodiment of the present disclosure, there is also provided a device for decoding feature data 1000, including a second memory 1001 and a second processor 1002.

The second memory 1001 is configured to store decoded instructions of executable feature data.

The second processor 1002 is configured to execute the decoded instructions of the executable feature data stored in the first memory to implement the method for decoding feature data provided by the embodiments in the present disclosure.

The second processor may be implemented by software, hardware, firmware or a combination thereof, circuits, single or multiple application specific integrated circuits (ASIC), single or multiple general purpose integrated circuits, single or multiple microprocessors, single or multiple programmable logic devices, or combinations of the foregoing circuits or devices, or other suitable circuits or devices can be used, so that the processor can execute the corresponding operations of the method for decoding feature data in the embodiments of the apparatus for processing feature data corresponding to the aforementioned cloud server.

Each component in embodiments of the present disclosure may be integrated in one processing unit, each unit may exist physically alone, or two or more units may be integrated in one unit. The above integrated unit may be implemented in the form of not only hardware but also a software functional module.

If an integrated unit is implemented in the form of a software functional module and is not sold or used as a stand-alone product, the integrated unit may be stored in a computer readable storage medium. Based on this understanding, the technical solutions of the embodiments of the present disclosure, in essence or the part contributing to the prior art, or the whole or part of the technical solutions can be embodied in the form of a software product. The computer software product is stored in a storage medium, and includes several instructions so that a computer device (which may be a personal computer, a cloud server, a network device or the like) or a processor implements all or part of the method according to respective embodiments of the present disclosure. The aforementioned storage medium includes: a ferromagnetic random access memory (FRAM), a read only memory (ROM), a programmable read-only memory (PROM), an erasable programmable read-only memory (EPROM), an electrically erasable programmable read-only memory (EEPROM), an electrically erasable programmable read-only memory (EEPROM), a flash memory, magnetic surface memory, an optical disc, or a compact disc read-only memory (CD-ROM) and other medium capable of storing program code are not limited by the embodiments of the present disclosure.

In the present disclosure, there is also provided a computer-readable storage medium, having stored thereon encoded instructions of executable feature data that, when executed by a first processor, causes to implement the method for encoding feature data provided by the embodiments in the present disclosure.

In the present disclosure, there is also provided a computer-readable storage medium, having stored thereon decoded instructions of executable feature data that, when executed by a second processor, causes to implement the method for decoding feature data provided by the embodiments in the present disclosure.

INDUSTRIAL APPLICABILITY

The embodiments of the present disclosure provide a method, an apparatus and a device for encoding and decoding feature data, and a storage medium. First feature data corresponding to each channel to be encoded is determined; data type conversion processing is performed on the first feature data corresponding to each channel to obtain second feature data that meets a data input condition of an apparatus for encoding feature data; spatial re-expression is performed on the second feature data corresponding to each channel to obtain third feature data, where a height of the third feature data conforms to a first height, a width of the third feature data conforms to a first width, and the third feature data includes the second feature data located at target positions of each channel; and the third feature data is encoded and signalled in a bitstream. That is to say, the second feature data is processed into third feature data having a height conforming to the first height and a width conforming to the first width by a spatial re-expression technique. Meanwhile, the third feature data includes second feature data located at target positions of each channel, that is, the second feature data is padded with the target size and the padding position is specified to ensure that there is only one feature data in a coding unit. The jump among data tends to be flat through the above padding mode, which reduces the interaction of feature data among different channels during encoding, and avoids the occurrence of feature data of two channels in the same coding block when encoding the feature data, so as to efficiently utilize the existing video encoding and decoding standards, thereby improving the encoding efficiency of the feature data.

The invention claimed is:
1. A method for encoding feature data, comprising:
   determining first feature data corresponding to each of channels to be encoded;
   performing data type conversion processing on the first feature data corresponding to each channel to obtain second feature data that meets a data input condition of an apparatus for encoding feature data;
   performing spatial re-expression on the second feature data corresponding to each channel to obtain third feature data, wherein a height of the third feature data conforms to a first height, a width of the third feature data conforms to a first width, and the third feature data comprises the second feature data located at a target position of each of the channels; and
   encoding the third feature data and signalling in a bitstream,
   wherein performing spatial re-expression on the second feature data corresponding to each channel to obtain the third feature data comprises:
   padding the second feature data corresponding to each channel in spatial domain based on a second height and a second width to obtain padded second feature data;
   splicing the padded second feature data corresponding to each channel into a target feature map in spatial domain, wherein the target feature map has the first height and the first width; and
   acquiring feature data of the target feature map to obtain the third feature data.

2. The method of claim 1, wherein the first height is an integer multiple of the second height, and the first width is an integer multiple of the second width.

3. The method of claim 1, wherein padding the second feature data corresponding to each channel in spatial domain based on the second height and the second width to obtain the padded second feature data comprises:
   padding the second feature data corresponding to each channel in spatial domain based on the target position, the second height and the second width to obtain the padded second feature data.

4. The method of claim 3, wherein different channels have same target positions.

5. The method of claim 4, wherein the target positions are initial positions of the padded second feature data of different channels in the channels, or the target positions are middle positions of the padded second feature data of different channels in the channels.

6. The method of claim 1, wherein after performing data type conversion processing on the first feature data corresponding to each channel to obtain the second feature data that meets the data input condition of the apparatus for encoding feature data, the method further comprises:
   acquiring a third height and a third width of the second feature data of single channel in each channel;
   acquiring a height difference between the second height and the third height;
   acquiring a width difference between the second width and the third width; and
   signalling a channel number corresponding to each channel, the third height, the third width, the height difference value and the width difference value in the bitstream.

7. The method of claim 1, wherein after performing data type conversion processing on the first feature data corresponding to each channel to obtain the second feature data that meets the data input condition of the apparatus for encoding feature data, the method further comprises:
   acquiring a maximum value and a minimum value in the first feature data of single channel in each channel; and
   signalling the maximum value and the minimum value in the bitstream.

8. The method of claim 1, wherein performing data type conversion processing on the first feature data corresponding to each channel to obtain the second feature data that meets the data input condition of the apparatus for encoding feature data comprises:
   performing integer conversion processing on the first feature data corresponding to each channel to obtain the second feature data that meets the data input condition of the apparatus for encoding feature data, wherein the second feature data is integer data.

9. The method of claim 8, wherein performing integer conversion processing on the first feature data corresponding to each channel to obtain the second feature data that meets the data input condition of the apparatus for encoding feature data comprises:
   performing integer conversion processing on the first feature data based on following formula to obtain the second feature data, $$\hat{y}_{ij} = \text{int}\left[\frac{x_{ij} - x_{min}}{x_{max} - x_{min}} * (2^n - 1)\right],$$

wherein $x_{ij}$ is a feature value of row i and column j in the first feature data, $x_{min}$ is a minimum value in the first feature data, $x_{max}$ is a maximum value in the first feature data, $\hat{y}_{ij}$ is a feature value of row i and column j in the second feature data, n is a bit number, and int[ ] is an integer function.

10. The method of claim 8, wherein performing integer conversion processing on the first feature data corresponding to each channel to obtain the second feature data that meets the data input condition of the apparatus for encoding feature data comprises:
   performing integer conversion processing on the first feature data based on following formula to obtain the second feature data, $$\hat{y}_{ij} = \text{int}\left[\frac{\log_2(1 + x_{ij})}{\text{max\_num}} \times \left(2^{BitDepth} - 1\right)\right],$$

wherein $\hat{y}_{ij}$ is a feature value of row i and column j in the second feature data, $x_{ij}$ is a feature value of row i and column j in the first feature data, int[ ] is an integer function, $\log_2()$ returns a logarithm of an input to base 2, max_num is a maximum value of feature data $\log_2(1+D)$ after logarithmic transformation, and BitDepth is a fixed-point bit number.

11. The method of claim 1, wherein determining the first feature data corresponding to each channel to be encoded comprises:
   acquiring a picture; and
   extracting the first feature data corresponding to each of channels of the picture.

12. A method for decoding feature data, comprising:
   acquiring a bitstream from an apparatus for encoding feature data;
   decoding the bitstream to obtain third feature data;
   performing spatial inverse expression on the third feature data to obtain second feature data corresponding to each of channels, wherein a height of the third feature data conforms to a first height, a width of the third feature data conforms to a first width, and the third feature data comprises the second feature data located at a target position of each of the channels; and
   performing data type conversion processing on the second feature data corresponding to each channel to obtain first feature data corresponding to each channel,
   wherein before performing spatial inverse expression on the third feature data to obtain the second feature data corresponding to each of the channels, the method further comprises:
   decoding the bitstream to obtain a channel number corresponding to each channel, a third height, a third width, a height difference and a width difference, wherein the second feature data has the third height and the third width, the height difference is a difference between the second height and the third height of padded second feature data, and the width difference is a difference between the second width and the third width of the padded second feature data;
   correspondingly, wherein performing spatial inverse expression on the third feature data to obtain the second feature data corresponding to each of the channels comprises:
   performing spatial splitting on the third feature data based on the height difference, the width difference, the channel number, the third height, the third width, the first height and the first width to obtain padded second feature data corresponding to each channel; and
   performing spatial pruning on the padded second feature data corresponding to each channel based on the third height, the third width and the target position of each channel to obtain the second feature data corresponding to each channel.

13. The method of claim 12, wherein before performing data type conversion processing on the second feature data corresponding to each channel to obtain the first feature data corresponding to each channel, the method further comprises:
   decoding the bitstream to obtain a maximum value and a minimum value in the first feature data of single channel in each channel; and
   correspondingly, wherein performing data type conversion processing on the second feature data corresponding to each channel to obtain the first feature data corresponding to each channel comprises:
   performing data type conversion processing on the second feature data based on the maximum value and the minimum value to obtain the first feature data corresponding to each channel.

14. The method of claim 13, wherein performing data type conversion processing on the second feature data based on the maximum value and the minimum value to obtain the first feature data corresponding to each channel comprises:
   performing floating-point conversion processing on the second feature data based on the maximum value and the minimum value to obtain the first feature data corresponding to each channel, wherein the first feature data is floating-point data.

15. The method of claim 14, wherein performing floating-point conversion processing on the second feature data based on the maximum value and the minimum value to obtain the first feature data corresponding to each channel comprises:
   performing floating-point conversion processing on the second feature data based on the following formula to obtain the first feature data, $$x_{ij} = \frac{\hat{y}_{ij}(x_{max} - x_{min})}{2^n - 1} + x_{min},$$

wherein $x_{ij}$ is a feature value of row i and column j in the first feature data, $x_{min}$ is a minimum value in the first feature data, $x_{max}$ is a maximum value in the first feature data, $\hat{y}_{ij}$ is a feature value of row i and column j in the second feature data, and n is a bit number.

16. The method of claim 14, wherein performing floating-point conversion processing on the second feature data based on the maximum value and the minimum value to obtain the first feature data corresponding to each channel comprises:

performing floating-point conversion processing on the second feature data based on following formula to obtain the first feature data, $$x_{ij} = 2\left(\frac{x_{max}}{2^{(2^{BitDepth})}-1} \times float(\hat{y}_{ij})-1\right),$$

wherein $x_{ij}$ is a feature value of row i and column j in the first feature data, $\hat{y}_{ij}$ is a feature value of row i and column j in the second feature data, $x_{max}$ is a maximum value in the first feature data, BitDepth is a fixed-point bit number, and float( ) converts input integer data into floating-point data.

17. An apparatus for decoding feature data, comprising:
a processor, and a memory configured to store decoded instructions of feature data executable by the processor, wherein the processor is configured to:
acquire a bitstream from an apparatus for encoding feature data;
decode the bitstream to obtain third feature data;
perform spatial inverse expression on the third feature data to obtain second feature data corresponding to each of channels, wherein a height of the third feature data conforms to a first height, a width of the third feature data conforms to a first width, and the third feature data comprises the second feature data located at a target position of each of the channels; and
perform data type conversion processing on the second feature data corresponding to each channel to obtain the first feature data corresponding to each channel,
wherein the processor is further configured to: before performing spatial inverse expression on the third feature data to obtain the second feature data corresponding to each of the channels,
decode the bitstream to obtain a channel number corresponding to each channel, a third height, a third width, a height difference and a width difference, wherein the second feature data has the third height and the third width, the height difference is a difference between the second height and the third height of padded second feature data, and the width difference is a difference between the second width and the third width of the padded second feature data;
correspondingly, wherein the operation of performing spatial inverse expression on the third feature data to obtain the second feature data corresponding to each of the channels comprises:
performing spatial splitting on the third feature data based on the height difference, the width difference, the channel number, the third height, the third width, the first height and the first width to obtain padded second feature data corresponding to each channel; and
performing spatial pruning on the padded second feature data corresponding to each channel based on the third height, the third width and the target position of each channel to obtain the second feature data corresponding to each channel.

* * * * *